US007196893B2

(12) United States Patent
Herrmann

(10) Patent No.: US 7,196,893 B2
(45) Date of Patent: Mar. 27, 2007

(54) ANTI-INTERFERENCE FILTER AND LIGHTNING CONDUCTOR DEVICE

(75) Inventor: Beat Herrmann, Herisau (CH)

(73) Assignee: Huber & Suhner AG, Herisau (CH)

( * ) Notice: Subject to any disclaimer, the term of this patent is extended or adjusted under 35 U.S.C. 154(b) by 0 days.

(21) Appl. No.: 10/527,942

(22) PCT Filed: Aug. 25, 2003

(86) PCT No.: PCT/CH03/00571

§ 371 (c)(1), (2), (4) Date: Mar. 16, 2005

(87) PCT Pub. No.: WO2004/032276

PCT Pub. Date: Apr. 15, 2004

(65) Prior Publication Data

US 2005/0286199 A1 Dec. 29, 2005

(30) Foreign Application Priority Data

Oct. 2, 2002 (CH) .................................... 1646/02

(51) Int. Cl.
*H02H 3/22* (2006.01)
*H02H 1/04* (2006.01)

(52) U.S. Cl. ...................................................... 361/119

(58) Field of Classification Search ................ 361/119
See application file for complete search history.

(56) References Cited

U.S. PATENT DOCUMENTS 2,032,513 A * 3/1936 Swart ......................... 361/136
2,379,262 A * 6/1945 Terry .......................... 361/201
2,650,301 A * 8/1953 Farmer ....................... 315/355
4,907,120 A * 3/1990 Kaczmarek et al. ........ 361/119

OTHER PUBLICATIONS

Int'l. App. No. PCT/CH2003/000571; Filed: Aug. 23, 2003; Priority Date: Oct. 2, 2002.

* cited by examiner

*Primary Examiner*—Brian Sircus
*Assistant Examiner*—Ann T. Hoang
(74) *Attorney, Agent, or Firm*—Notaro & Michalos PC

(57) ABSTRACT

The anti-interference filter and lightning arrester device is equipped with two series-connected gas capsule diverters (6, 7). With the gas capsule diverters (6, 7) a switching configuration (9) is connected. This switching configuration (9) is implemented such that in the event of an interference, the gas capsule diverters (6, 7) can be reliably reset to the nonconducting state. This is even possible in the presence of a DC voltage and/or high-frequency signals.

8 Claims, 3 Drawing Sheets

ANTI-INTERFERENCE FILTER AND LIGHTNING CONDUCTOR DEVICE

BACKGROUND OF THE INVENTION

The invention relates to an anti-interference filter and lightning arrester device in a coaxial line for the transmission of high-frequency signals, comprising a housing with two connectors, the housing forming an outer conductor connected to ground, an inner conductor carried through the housing, a connection between inner conductor and housing for diverting overvoltages and a gas capsule diverter in the connection between inner conductor and housing.

Anti-interference filter and lightning arrester devices of this type are known. They serve for the purpose of protecting structural groupings, apparatus or facilities connected to lines, for example coaxial lines of telecommunication devices, against electromagnetic pulses (EMP), overvoltages and/or lightning currents. Electromagnetic pulses of artificial type can be generated for example by motors, switches, clocked power supplies or also in connection with nuclear events. Pulses of natural origin can result, for example, as a consequence of direct or indirect lightning strikes. The known protective circuits are disposed at the input side of the structural groupings, apparatus or facilities and/or are installed as a structural component in the coaxial line.

An EMP diverter of this type with a gas capsule or gas discharge overvoltage diverter is known from CH 660 261 A5. This EMP diverter comprises a housing serving as outer conductor and connected to ground. Disposed at both ends of the housing are connectors, by means of which the housing can be connected with one end each of a coaxial cable. Through the center of the housing is carried an inner conductor which, in the proximity of the connectors, can also be connected with the coaxial cable. Radially with respect to the inner conductor is disposed a housing portion, which serves for accommodating the overvoltage diverter in the form of a gas capsule. This overvoltage diverter is connected, on the one hand, to the inner conductor and, on the other hand, to the housing and therewith to ground. Gas capsule overvoltage diverters have the property that during normal operation their resistance is on the order of a few GΩ. Upon reaching a specified ignition voltage, an electric flashover occurs and the resistance of the gas capsule jumps to values of less than 1Ω. This state occurs in the case of interference if, for example, on the antenna side, an overvoltage occurs due to a lightning strike. The gas capsule overvoltage diverter protects the elements located on the apparatus side by diverting the overvoltage low-ohmically to ground. After the decay of the overvoltage, the gas capsule becomes high-ohmic and returns to the normal operating state, i.e. it acts again as an isolation. During the time interval in which the gas capsule is low-ohmic, the so-called arc burning voltage is connected to the gas capsule. This burning voltage is on the order of a few 10 V. As long as a current of a few 10 mA flows, the arc discharge persists and the gas capsule remains in the low-ohmic state. This may occur for example if across the coaxial cable or the anti-interference filter and lightning arrester device an additional DC control current is conducted or in the presence of high-frequency signals of relatively high power. In these cases a device with a gas capsule diverter has the considerable disadvantage that after a response, for example due to a lightning strike, it is no longer extinguished but rather remains permanently in the low-ohmic state. To restore the normal state, the DC control current must in this case be switched off and/or the high-frequency signal must be interrupted. Normally this requires switching off the particular facility and switching it on again, which entails considerable complications and/or is especially undesirable in communication facilities.

SUMMARY OF THE INVENTION

The aim of the present invention is to provide an anti-interference filter and lightning arrester device in which undesirable overvoltages are diverted to ground via a gas capsule diverter and in which it is ensured that the gas capsule diverter, after the suppression of the interference, in spite of the presence of DC voltage and/or high-frequency signals, changes from the conducting to the nonconducting state even if the applied voltage is higher than the burning voltage of the gas capsule diverter.

The various features of novelty which characterize the invention are pointed out with particularity in the claims annexed to and forming a part of this disclosure.

In the solution or device, respectively, according to the invention in the connection for diverting overvoltages between inner conductor and housing two gas capsule diverters are inserted in series. Between the two gas capsule diverters is located a contact point, and between this contact point and ground, a switching configuration is disposed with an interrupter element for interrupting a current flowing across the gas capsule diverter. This solution according to the invention permits the diverting of interference or overvoltages in that both series-connected gas capsule diverters are ignited sequentially and set up a connection between inner conductor and ground. After the overvoltages have been suppressed and if a voltage, which is higher than the burning voltage, continues to be present at the two gas capsule diverters, the voltage at the contact point between the two gas capsule diverters is reduced with the switching configuration so far that the second gas capsule directed to ground is extinguished. After extinguishing the second of the two gas capsules, the current flows across the first gas capsule and the contact point across the switching configuration to ground. The switching configuration now permits the interruption of this current flow whereby the first gas capsule diverter is also extinguished. Therewith the two gas capsule diverters can be reset from the conducting to the nonconducting state without the control voltages or high-frequency currents applied to the apparatus needing to be interrupted. This permits the completely automatic resetting of the anti-interference filter and lightning arrester into the normal state in which there is no conductive connection between inner conductor and ground. Resetting the two gas capsule diverters from the conducting to the nonconducting state can take place in a very short time, such that, after an interference event, the apparatus is immediately ready again for operation.

An advantageous solution comprises that the switching configuration includes a resistance element connected to the contact point, a voltage-limiting element connected in series with this resistance element, and a coil of a switching relay also connected in series with the resistance element, the voltage-limiting element and the coil of the switching relay being connected in parallel. The resistance element, which is connected directly with the contact point between the two gas capsule diverters, ensures that, upon the occurrence of an overvoltage, in a first phase the overvoltage is not diverted across the switching configuration to ground, but rather that the two gas capsule diverters are ignited successively and the overvoltage, or the overcurrent, in a first phase is diverted directly across the gas capsule diverters to ground. An especially suitable resistance element is for example an inductor. If, after the suppression of the interference voltage, there is still a voltage at the gas capsule diverters which is higher than the burning voltage and a corresponding current flows across the two gas capsule diverters, this current flows from the contact point also across the resistance element, for example in the form of an inductor, and the voltage-limiting element to ground. A suitable voltage-limiting element is for example a diode or a voltage dependent resistor (VDR). The voltage dependent element, for example in the form of a diode, serves for the purpose of protecting the inductor and the coil of the switching relay against undesirable interference states and to reduce the voltage to below the arc burning voltage of the gas capsule. However, the current flows simultaneously also from a branch point after the resistance element across the coil of the switching relay. This switching relay is a component of an interrupter element, which serves for interrupting the current flowing across the gas capsule diverter. For this purpose the interrupter element is advantageously implemented as an interrupter switch and is installed in the connection line after the resistance element. This interrupter switch is connected with the coil of the switching relay and is actuated by the same. The interrupter switch is installed in the connection line between the resistance element and the branch point.

Upon the occurrence of an overvoltage, the two series-connected gas capsule diverters are ignited in succession as a consequence of the rapid rise of the voltage and form a conducting connection between the inner conductor and the housing or ground. In the conducting state of the two gas capsule diverters a burning voltage of 10 V, for example, is applied at the contact point between the two gas capsule diverters, and in front of the first gas capsule, a voltage of, for example, 20 V. This applies if two identical gas capsule diverters are employed and these gas capsule diverter have each a burning or arc voltage of 10 V in the conducting state. When there is no longer a overvoltage present and no additional voltage is connected to the apparatus, the voltage falls below the burning voltage of the gas capsule diverters and they are extinguished or switch from the conducting to the nonconducting state. However, if, after the suppression of the overvoltage, there is still a voltage at the apparatus which is higher than the burning voltage of the gas capsule diverters, they remain in the conducting state. If the residual current is the consequence of a DC control voltage applied to the apparatus, this current now flows also through the resistance element, for example an inductor, and via the voltage-limiting element, for example a diode, to ground. The series-connected inductor and the diode are therein selected such, that the voltage at the contact point between the two gas capsule diverters falls below the burning voltage, for example to 8 V, whereby the second gas capsule connected to ground is extinguished or reset to the nonconducting state. From the branch point after the resistance element, current also flows parallel to the voltage-limiting element across the coil of the interrupter element or of the switching relay. The coil is so implemented that the switching process takes place with a delay, this delay being selected such, that, first, the second gas capsule diverter is extinguished or reset to the nonconducting state. After the passage of this delay time, the switching relay actuates the interrupter switch and interrupts the connection line between the resistance element and the branch point or ground. Thereby the current flowing across the first gas capsule diverter is also interrupted and is also extinguished, i.e. it is reset to the nonconducting state.

Disposing a decoupling line between the inner conductor and the first gas capsule diverter connected with the inner conductor has further advantages. These comprise that the two gas capsule diverters and the switching configuration are decoupled from high-frequency currents or signals. This decoupling line is tuned to the frequency transmitted across the coaxial line. This advantageous disposition of an additional decoupling line ensures that high-frequency signals with a voltage level above the burning voltage of the gas capsule diverter are not conducted into the proximity of the switching configuration. The decoupling line is implemented in a manner known per se, for example as described in WO 99/43052 or EP 0 938 166 A1. Suitable decoupling lines are $\lambda/4$ lines or resonance circuits.

The interrupter element in the form of an interrupter switch associated with the switching configuration can also be installed directly in the inner conductor and the interrupter switch is in this case also directly connected with the coil of the switching relay and is actuated by it. This disposition is useful for example in communication devices with an antenna and a base station, the interrupter switch being installed in the inner conductor at the apparatus-end. By briefly interrupting the inner conductor, therewith control voltages or high-frequency signals with sufficiently high power, which are emitted by the base station, can be briefly interrupted in order for the gas capsules to be extinguished. In this solution the disposition of the gas capsule diverters and of the switching configuration are for the remainder implemented identically to the way described above.

BRIEF DESCRIPTION OF THE DRAWINGS

In the following the invention will be described based on embodiment examples with reference to the enclosed drawing. Therein depict.

DETAILED DESCRIPTION OF THE INVENTION

Figure 1:
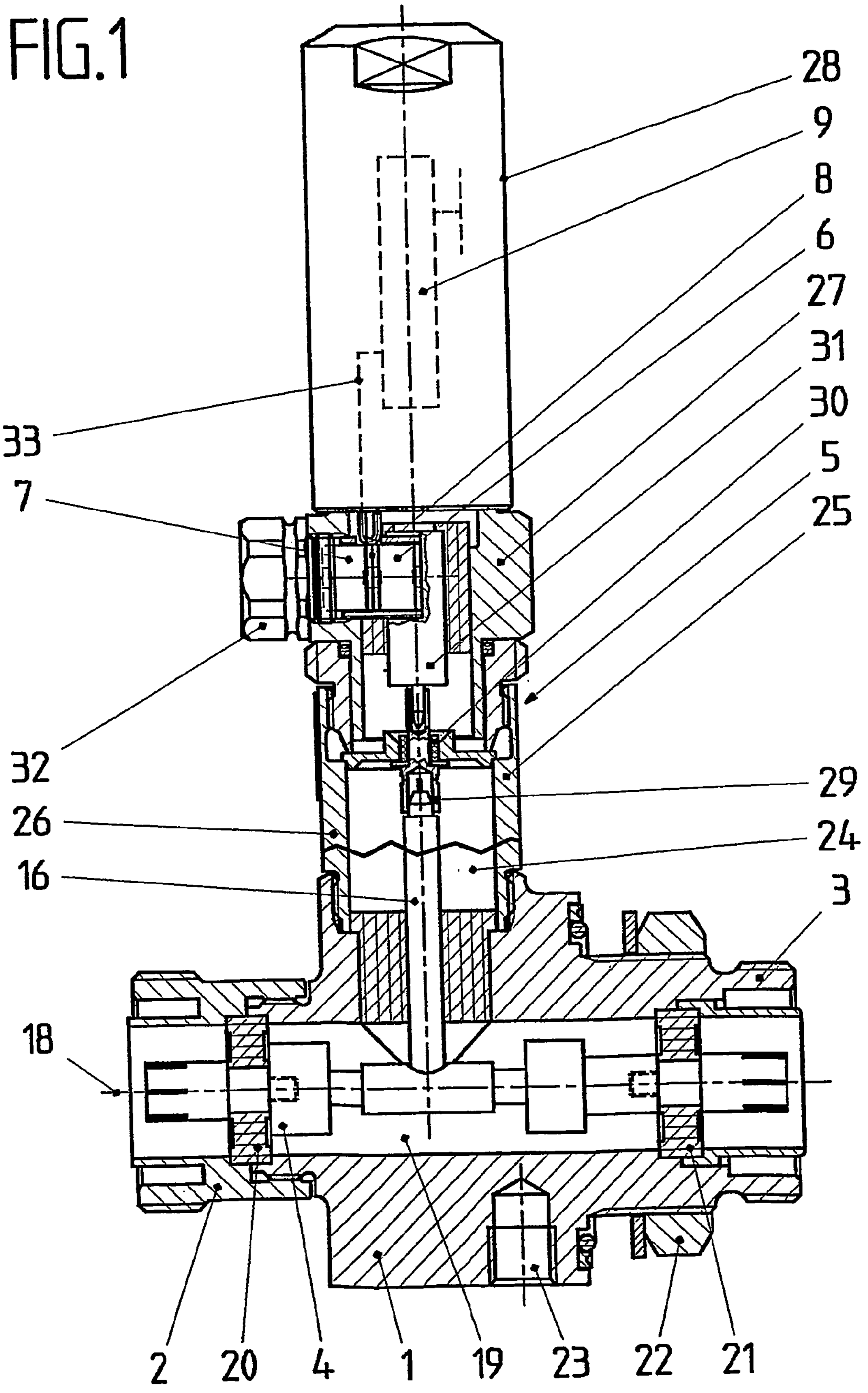
FIG. 1 a device according to the invention with high-frequency (HF) decoupling in partial section, FIG. 2 a simplified equivalent circuit diagram of the device according to FIG. 1, and FIG. 3 a simplified equivalent circuit diagram of a device according to the invention without HF decoupling.

FIG. 1 represents an anti-interference filter and lightning arrester device suitable as insertion adapter for a coaxial cable into an structural apparatus component in a telecommunication device. At each end a housing 1 comprises in the direction of a longitudinal axis 18 a connector 2, 3. These connectors 2, 3 serve to connect the ends of coaxial cables with the device. Through an interior hollow space 19 of the housing 1 is guided an inner conductor 4, which is separated by insulators 20, 21 from housing 1. The housing 1 comprises a threaded joint 22, which serves for connecting the device with an apparatus wall or ground bar. A threaded bore 23 on housing 1 serves for fastening a ground conductor. In housing 1 is disposed a throughlet opening 24, in which an additional housing 25 is fastened. This additional housing 25 is comprised of several housing parts 26, 27 and 28, but it can also be implemented as a single part. The first additional housing part 26 serves for receiving a decoupling line in the form of a $\lambda/4$ line 16 connected with the inner conductor 4 and branching off from it approximately at right angles. This $\lambda/4$ line 16 forms a first section of the connection 5 between the inner conductor 4 and housing 1, which serves for diverting overvoltages. At the end 29, remote from the inner conductor 4, of the λ/4 line 16 a capacitor 30 as well as a connecting element 31 is disposed. This connecting element 31 is implemented as a mounting for two gas capsule diverters 6, 7 and connected in conductance with the λ/4 line 16. The two gas capsule diverters 6, 7 are connected in series and installed approximately radially in the additional housing part 27.

Between the first gas capsule diverter 6 and the second gas capsule diverter 7 connected in series with it, is developed a contact point 8 and the second gas capsule diverter 7 is connected via the closure screws 32 in conductance with the housing 1 or ground. Connected by means of line 33 with the contact point 8 between the two gas capsule diverters 6, 7 is a switching configuration 9. The switching configuration 9 is disposed in the interior space of the additional housing part 28. The details with respect to this switching configuration 9 are shown in FIG. 2 and described accordingly.

The decoupling line, or λ/4 line 16 installed in this preferred solution, serves for the purpose of decoupling in a manner known per se the remaining diverter elements from the high-frequency signals on the inner conductor 4. Upon the occurrence of an overvoltage, this overvoltage is diverted via the λ/4 line 16 and the connecting element 31 via the gas capsule diverters 6 and 7 to ground. This type of diverting of overvoltages is known per se. In coaxial lines, across which DC control voltages are also transmitted whose voltage is higher than the burning voltage of the gas capsule diverters 6, 7, difficulties occur in the known solutions since the gas capsule diverters 6, 7 are no longer reset to the nonconducting state when the overvoltage decays. The switching configuration 9 now serves for separating, first, the gas capsule diverter 7 and subsequently the gas capsule diverter 6 from the currents flowing and to change them to the nonconducting state.

Figure 2:
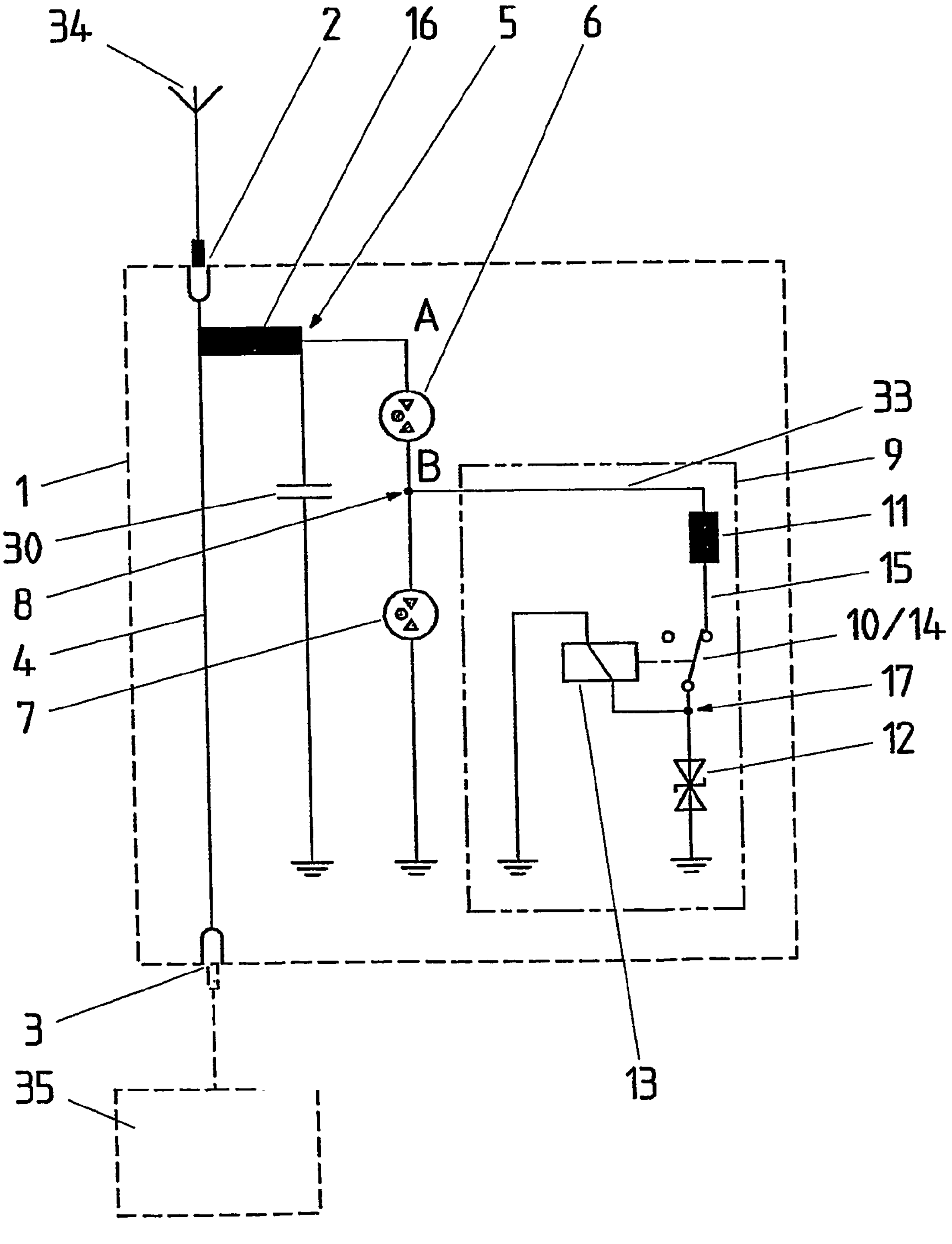

FIG. 2 shows a simplified equivalent circuit diagram for the device according to the invention in accordance with FIG. 1. The housing 1, which forms an outer conductor, and the inner conductor 4 are connected across the connectors 2, 3 and coaxial lines connected thereto, on the one hand, with an antenna 34 and, on the other hand, with a facility part or apparatus 35. To divert overvoltages and/or interference voltages, a connection 5 is disposed between the inner conductor 4 and the housing 1 connected to ground, which connection 5 in the event of an interference protects the facility part or apparatus 35 and diverts corresponding interference voltages or currents. The connection 5 is substantially comprised of three structural groups. A first group includes the decoupling line, or λ/4 line 16, and the capacitor 30 connected in series with it, in order to short-circuit the high-frequency signals on the inner conductor 16 with ground. The second group is connected in series with the λ/4 line 16 and comprises two series-connected gas capsule diverters 6 and 7. Between the first of these gas capsule diverters 6 and the second gas capsule diverter 7 is located a contact point 8 with which the third structural group, the switching configuration 9, is connected. In line 33 extending from contact point 8, a resistance element in the form of an inductor 11 is disposed and in series with this inductor 11 a voltage-limiting element in the form of a diode 12, as well as parallel to diode 12 via a branch point 17 a coil 13 of a switching relay. In the connecting line 15 extending from inductor 11 in front of the branch point 17 is installed an interrupter element 10 in the form of an interrupter switch 14. This interrupter switch 14 is actuated by coil 13. In the normal state the interrupter switch 14 is closed, i.e. a current can flow from contact point 8 via line 33, inductor 11, connection line 15 and via the branch point 17 via diode 12 and coil 13 to ground. In the depicted example the diode 12 is a TVS diode, this diode 12 essentially protecting the coil 13 of the switching relay and being responsible for the voltage at contact point 8 being decreased below the arc burning voltage of capsule 7. With the depicted device according to the invention an effective protection of facility parts 35 against interference and overvoltages, for example lightning strikes, is ensured when utilizing gas capsule diverters. The gas capsule diverters 6, 7 can automatically be reset to the nonconducting state after an overvoltage has been diverted even if on the coaxial line, or the inner conductor 4, DC control voltages or high-frequency signals are present whose voltage is higher than the burning voltage of the gas capsule diverters 6 and 7.

The depicted anti-interference filter and lightning arrester device functions in the following manner. If, for example, due to a lightning strike via the antenna 34 at connector 2 of housing 1 an overvoltage occurs, this overvoltage is conducted via the λ/4 line 16 into connection 5. At point A in front of the gas capsule diverter 6 the voltage increases very rapidly and at approximately 700 V this gas capsule diverter 6 ignites. At the succeeding point B, i.e. in front of gas capsule diverter 7, the voltage therewith also increases immediately and the gas capsule diverter 7 also ignites. Via the two conducting gas capsule diverters 6 and 7 the overvoltage is immediately diverted to ground. During the diverting process a voltage of approximately 20 V is present at point A, which corresponds to the twofold burning voltage, and at point B a voltage of approximately 10 V. Via line 33 branching off from point B, or from contact point 8, and therewith via the inductor 11 current does not yet flow since the voltage rise is too fast. As soon as the lightning strike has past and the overvoltage breaks down and a DC control voltage is present, however, at the inner conductor 4 the DC control voltage is still present. If it is higher than the burning voltage of the gas capsule diverters 6 and 7 these continue to remain in the conducting state. In the case of the devices known until now, the control current had to be switched off, in order to extinguish the gas capsule diverters 6, 7. According to the present invention this is no longer necessary since at constant voltage at contact point 8 now also current flows off via the inductor 11 and the diode 12. This leads to a voltage breakdown at contact point 8, or point B, to approximately 8 V, with the consequence that the second gas capsule diverter 7 is extinguished and is reset to die conducting state. However, simultaneously in switching configuration 9 a current also flows from branch point 17 via the coil 13 of the switching relay. This coil 13 has a switching delay of a few milliseconds, for example of 3 milliseconds, until the interrupter element 10, or the interrupter switch 14, is actuated. As soon as the interrupter switch 14 is opened, the current flow through line 33 and therewith through connection 5 is interrupted. As a consequence the gas capsule diverter 6 is also extinguished and is reset to the nonconducting state. As soon as no current flows any longer in the connecting line 33, the coil 13 is deactivated and the interrupter switch 14 closes again. Therewith the entire configuration is again in the normal state and is automatically ready again for further interference cases.

Figure 3:
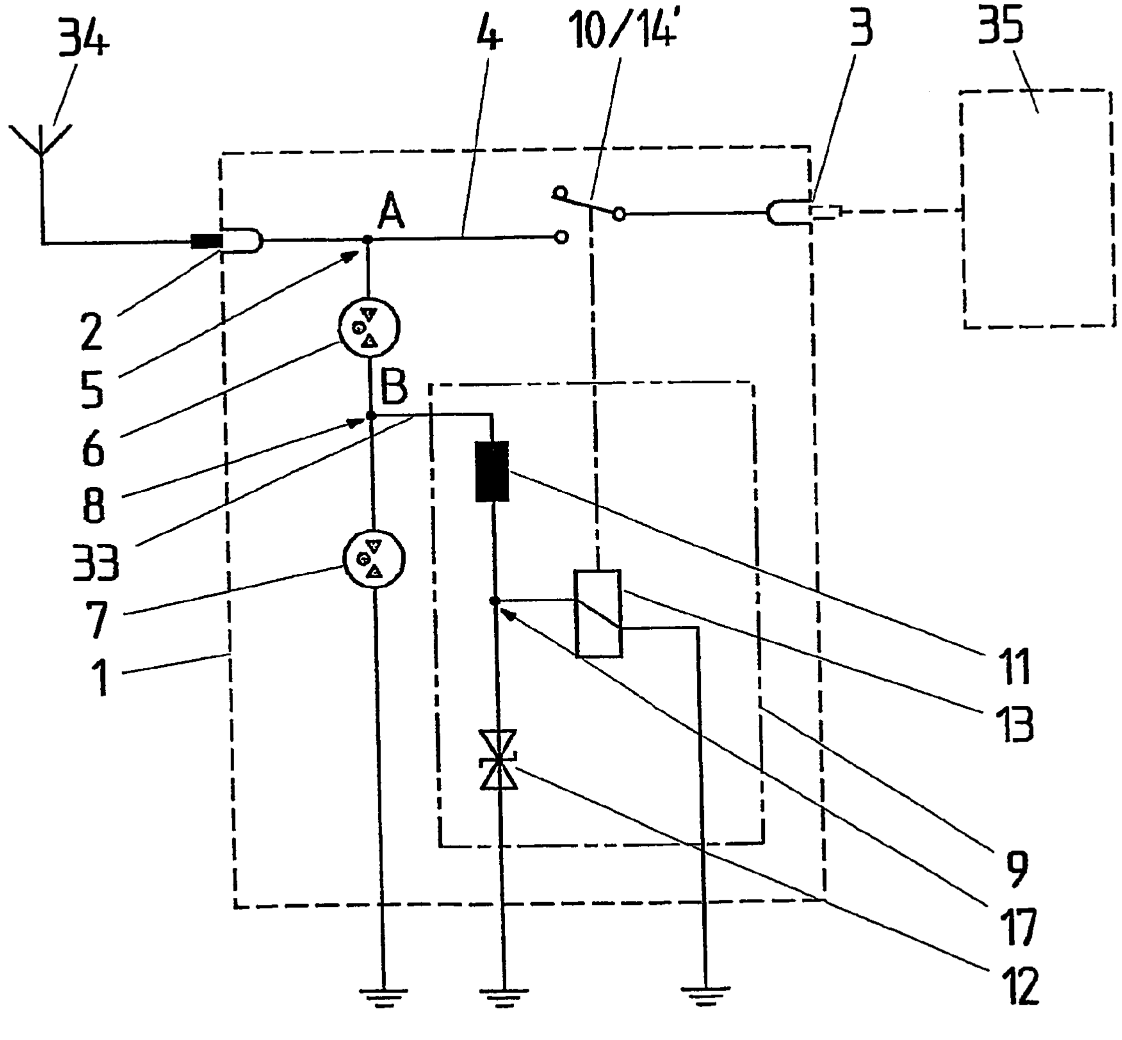

FIG. 3 shows a further variant of the device according to the invention in a simplified equivalent circuit diagram. In this configuration the connection 5, and therewith the switching configuration 9, is not decoupled from the high-frequency signals. Therefore connection 5 between inner conductor 4 and housing 1 in this embodiment comprises only two structural groups. The first structural group comprises the two series-connected gas capsule diverters 6 and 7, which ensure the diverting of overcurrents to ground. The second structural group comprises the elements disposed with line 33 between contact point 8 and ground. In line 33, again, a resistance element in the form of an inductor 11 is disposed and in series with it a diode 12. Via the branch point 17 is disposed in parallel to diode 12 the coil 13 of a switching relay. Via this coil 13 the interrupter element 10 in the form of an interrupter switch 14' is actuated. This interrupter switch 14' is installed in the inner conductor 4, and it is closed in the normal state. If in this configuration, due to an overvoltage, the two gas capsule diverters 6 and 7 are ignited and the overvoltage is diverted to ground, in this case after the suppression of the overvoltage the inner conductor 4 must be briefly interrupted in order to ensure the extinguishing of the two gas capsule diverters 6, 7 in every case. In this embodiment the actuation of the switch 14' also takes place automatically and the latter is immediately, after the gas capsule diverter 6 is extinguished, reset again to the closed state. These switching processes occur within milliseconds, which is the reason for their being safe for the operation of the facility. Except for the disposition of the interrupter switch 14' and the absent high-frequency decoupling, the function of this embodiment corresponds to that described in connection with FIG. 2.

The invention claimed is:

1. Anti-interference filter and lightning arrester device in a coaxial line for the transmission of high-frequency signals, comprising a housing (1) with two connectors (2, 3), the housing (1) forming an outer conductor connected to ground, an inner conductor (4) carried through the housing (1), a connection (5) between inner conductor (4) and housing (1) for the diverting of overvoltages and two gas capsule diverters (6, 7) in the connection (5) between inner conductor (4) and housing (1), characterized in that in the connection (5) between inner conductor(4) and housing (1) the two gas capsule diverters (6, 7) are interconnected in series, between the two gas capsule diverters (6, 7) a contact point (8) is disposed and a switching configuration (9) with an interrupter element (10) for the interruption of a current flowing across the gas capsule diverters (6, 7) is disposed between the contact point (8) and the housing (1) or ground, the switching configuration (9) comprising a resistance element (11) connected with the contact point (8), a voltage-limiting element (12) being connected in series with the resistance element (11), and a coil (13) of a switching relay also being connected in series with the resistance element (11), the voltage-limiting element (12) and the coil 13 of the switching relay being connected in parallel.

2. Anti-interference filter and lightning arrester device as claimed in claim 1, characterized in that the interrupter element (10) is developed as an interrupter switch (14) and installed in the connecting line (15) following the resistance element (11) and the interrupter switch (14) is connected with the switching relay and is actuated by it.

3. Anti-interference filter and lightning arrester device as claimed in claim 1, characterized in that between the inner conductor (4) and the gas capsule diverter located between the inner conductor and the contact point, connected with the inner conductor (4), at least one decoupling line (16) is disposed.

4. Anti-interference filter and lightning arrester device as claimed in claim 1, characterized in that the interrupter element (10) is an interrupter switch (14') and the interrupter switch (14') is installed in the inner conductor (4) and is connected with the switching relay and is actuated by it.

5. Anti-interference filter and lightning diverter device as claimed in claim 1, characterized in that the coil (13) of the switching relay has a switching delay.

6. Anti-interference filter and lightning arrester device as claimed in claim 1, characterized in that the resistance element (11) is an inductor.

7. Anti-interference filter and lightning arrester device as claimed in claim 1, characterized in that the voltage-limiting element (12) is a diode or a voltage dependent resistor (VDR).

8. Anti-interference filter and lightning arrester device as claimed in claim 3, characterized in that the decoupling line (16) is a $\lambda/4$ line or a resonance circuit.

* * * * *